US008266316B2

(12) United States Patent
Choi et al.

(10) Patent No.: US 8,266,316 B2
(45) Date of Patent: Sep. 11, 2012

(54) CLIENT APPARATUS AND METHOD OF STREAMING CONTENT, AND COMPUTER READABLE RECORDING MEDIUM STORING PROGRAM FOR PERFORMING THE METHOD

(75) Inventors: Jun-hae Choi, Seongnam-si (KR); Seung-gi Chang, Seoul (KR); Ju-han Lee, Suwon-si (KR); Ho-jeong You, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1045 days.

(21) Appl. No.: 11/599,413

(22) Filed: Nov. 15, 2006

(65) Prior Publication Data

US 2007/0214279 A1  Sep. 13, 2007

(30) Foreign Application Priority Data

Mar. 8, 2006 (KR) .......................... 10-2006-0021834

(51) Int. Cl.
*G06F 15/16* (2006.01)
(52) U.S. Cl. ........................................................ 709/232
(58) Field of Classification Search .................. 709/246, 709/245, 244, 242, 233, 232, 231, 229, 228, 709/227, 225, 224, 236; 707/9, 5, 4, 3, 201, 707/200; 706/45, 16, 12; 705/52, 400, 39, 705/37, 26; 345/420, 506, 619, 629; 713/176, 713/181; 715/727, 745, 810, 816
See application file for complete search history.

(56) References Cited

U.S. PATENT DOCUMENTS

| | | | | |
|---|---|---|---|---|
| 2002/0087887 A1* | 7/2002 | Busam et al. | | 713/201 |
| 2004/0122741 A1* | 6/2004 | Sidman | | 705/26 |
| 2004/0236863 A1* | 11/2004 | Shen et al. | | 709/231 |
| 2006/0010096 A1* | 1/2006 | Crossland et al. | | 707/1 |
| 2006/0036757 A1* | 2/2006 | Na et al. | | 709/231 |

FOREIGN PATENT DOCUMENTS

| | | |
|---|---|---|
| JP | 2004-213508 A | 7/2004 |
| JP | 2006-011693 A | 1/2006 |
| KR | 10-2003-0056701 A | 7/2003 |
| KR | 2003-0056701 A | 7/2003 |
| KR | 10-20050031320 A | 4/2005 |
| WO | 2005/018158 A1 | 2/2005 |
| WO | WO2005/018158 A1 * | 2/2005 |
| WO | WO 2005018158 A1 * | 2/2005 |

* cited by examiner

*Primary Examiner* — David Lazaro
*Assistant Examiner* — Charles Murphy
(74) *Attorney, Agent, or Firm* — Sughrue Mion, PLLC (57) ABSTRACT

An apparatus and method of streaming content by adaptively selecting a peer-to-peer (P2P) method or a server-client method according to a network environment, and a computer readable medium having recorded thereon a program for executing the method are provided. The apparatus includes middleware which supports the P2P method, middleware which supports the server-client method, an adaptation manager which provides a list of content, determines one of at least one node and at least one server sharing content which is selected as a source device according to a content sharing method and their available bandwidths, and determines a content sharing method used by the source device as a streaming method, and an application unit which controls the selected content to be received from the source device by using middleware and a transfer layer corresponding to the determined streaming method, and the received content to be reproduced.

14 Claims, 6 Drawing Sheets

CLIENT APPARATUS AND METHOD OF STREAMING CONTENT, AND COMPUTER READABLE RECORDING MEDIUM STORING PROGRAM FOR PERFORMING THE METHOD

CROSS-REFERENCE TO RELATED PATENT APPLICATION

This application claims priority from Korean Patent Application No. 10-2006-0021834, filed on Mar. 8, 2006 in the Korean Intellectual Property Office, the disclosure of which is incorporated herein in its entirety by reference.

BACKGROUND OF THE INVENTION

1. Field of the Invention

The apparatuses and methods consistent with the present invention relate to streaming audio/video (AV) content, and more particularly, to a content streaming client apparatus and method of adaptively selecting a peer-to-peer (P2P) method or a server-client method according to a network environment and streaming content according to the selected method, and a computer readable recording medium having recorded thereon a program for performing the method.

2. Description of the Related Art

AV streaming is an important application employed in a home network, which generally uses a home server that holds source content, and a client that accesses the home server to request and receive content.

Figure 1:
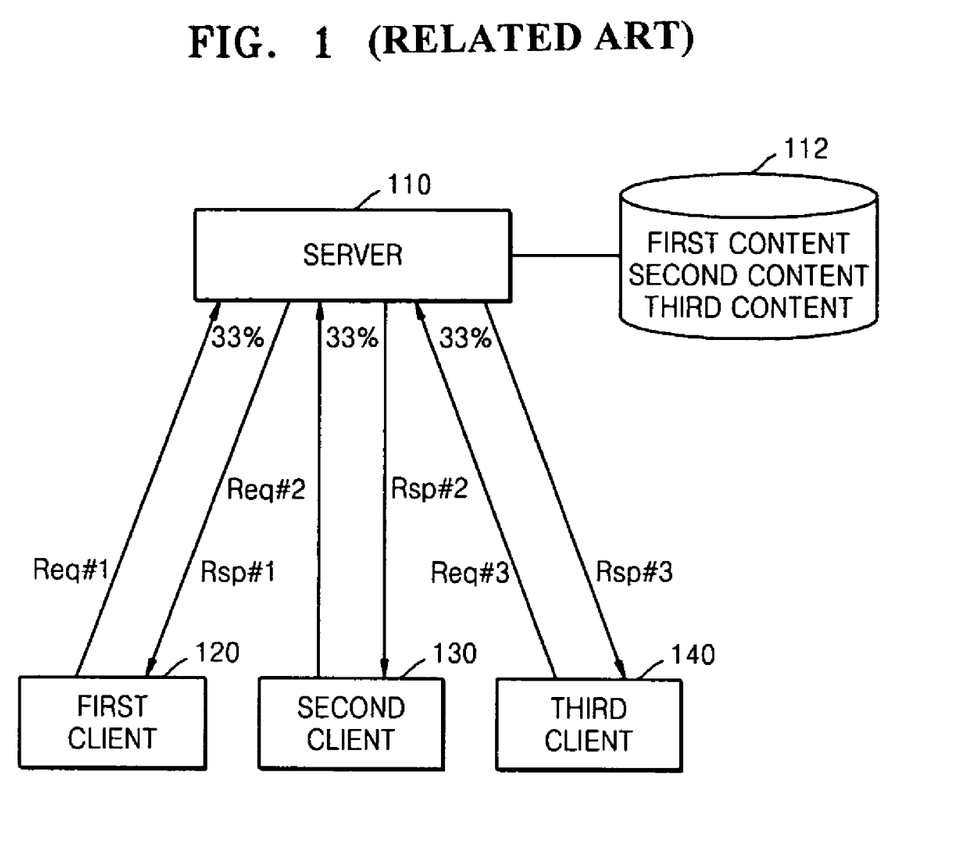
FIG. 1 is a block diagram for explaining a related art content streaming service according to a server-client method.

FIG. 1 is a diagram illustrating a content streaming service according to a related art server-client method. Referring to FIG. 1, a server 110, having a database 112 that stores content, provides a content streaming service to first, second and third clients 120, 130 and 140. Assuming that first, second and third content having the same data rate are present, when the first through third clients 120, 130 and 140 respectively request the first through third content, the bandwidth of a downlink of the server 110 is divided into three equal pieces to be used for providing the first through third content. When the number of clients is increased, a bandwidth allocated to each client is decreased because it is inversely proportional to the number of the clients. A streaming client application employing the server-client method is always connected to the server 110 in order to receive data therefrom. In this case, the more clients there are, the greater load there is on the server 110, and the Quality of Service (QoS) of a streaming service may be degraded due to insufficient bandwidth.

Also, various video streaming services have recently been provided via the Internet. In most cases, the server-client method is used. However, when a server provides a video streaming service via the Internet, a very large number of clients are likely to access the server at the same time, and thus, the server may have difficulties in content streaming due to bandwidth shortage or insufficient CPU performance. Thus, a multicast method or the P2P method is mainly used for effective use of bandwidth. The P2P method allows peers to share their files, whereby a server and a client are not definitely determined and each peer operates as a transmitter or a receiver as required. The P2P method is used in file sharing services, such as Napster, Soribada, and Gnutella.

The P2P method prevents too much load from being applied onto a specific server, and improves the overall throughput by using a plurality of peers in a network. However, the advantageous P2P method is difficult to apply directly to content streaming services via a home network, since an application according to the server-client method has already been used in the home network. Also, when a server and a plurality of clients that can operate as a server are present, a technique needs to be developed to effectively use the whole bandwidth allocated to a household in determining from which of the server and the clients data is to be received.

SUMMARY OF THE INVENTION

The present invention provides a content streaming client apparatus and method capable of displaying a list of content to be reproduced with respect to all content shared according to a P2P method and a server-client method, regardless of a sharing method, and also capable of selecting a server based on the whole bandwidth when a user selects content, which is to be reproduced, from the list. A computer readable recording medium having recorded thereon a program for executing the method is also provided.

According to an aspect of the present invention, there is provided a streaming client apparatus which performs streaming of content selected from a list of content via a network interface, and reproduces the streamed content, the apparatus comprising P2P (peer-to-peer) middleware which supports a P2P method; server-client middleware which supports a server-client method; an adaptation manager which provides a list of content, determines one of at least one node and at least one server which share content selected from the list of content as a source device, and determines a method of sharing the selected content, which is used by the source device, as a streaming method; and an application unit which controls the selected content to be received from the source device by using middleware and a transfer layer corresponding to the determined streaming method, and the received content to be reproduced.

The apparatus may further comprise a storage unit which stores the received content. When an external device requests content, the application unit may control the requested content to be read from the storage unit and the read content to be transmitted through the P2P middleware.

The adaptation manager may comprise a content list manager which combines lists of content received through the P2P middleware and the server-client middleware so as to make and display the list of content to be provided to the user.

The adaptation manager may further comprise a resource manager which determines the source device and the streaming method based on information regarding the list of the content from the content list manager, and informs the application unit of middleware corresponding to the determined streaming method.

The resource manager may measure available bandwidth between the streaming client apparatus and each of the at least one node and the at least one server which share the selected content, and determine one of the at least one node and the at least one server, which has a maximum measured bandwidth, as the source device.

The adaptation manager may further comprise a bandwidth monitoring unit which transmits a probe to the at least one node and the at least one server which share the selected content, obtains the bandwidths available to the at least one node and the at least one server based on a result of the transmitting the probe, and transmits the bandwidths to the resource manager.

When the selected content is shared according to both the P2P method and the server-client method and requested according to a multicast method, the resource manager may determine one of the at least one node which shares the selected content as the source device and the P2P method as the streaming method.

When the selected content is shared according to both the P2P method and the server-client method and requested according to a unicast method, the resource manager may measure available bandwidth between the streaming client apparatus and each of the at least one node and the at least one server which share the selected content, and determine one of the at least one node and the at least one server, which has a maximum measured bandwidth, as the source device.

According to another aspect of the present invention, there is provided a method of streaming content in a content streaming client apparatus, the method comprising receiving a list of content shared according to a P2P method and a list of content shared according to a server-client method, from at least one node and at least one server; creating a list of content to be provided to a user by combining the received lists of content, and displaying the created list of content; the user selecting content, which is to be reproduced, from the displayed list of content; determining one of the at least one node and the at least one server which share the selected content as a source device which transmits the selected content; and receiving the selected content from the source device according to a content sharing method used by the source device.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, exemplary embodiments of the present invention will be described in detail with reference to the accompanying drawings.

Figure 2:
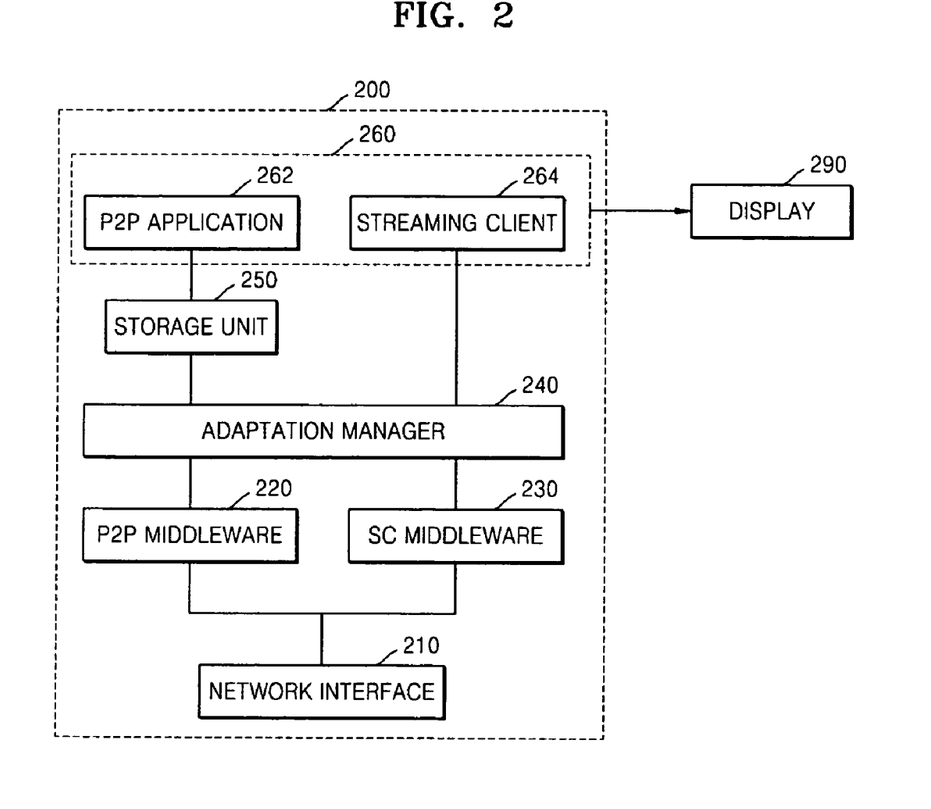
FIG. 2 is a block diagram of a content streaming client apparatus employing a P2P method according to an exemplary embodiment of the present invention.

FIG. 2 is a block diagram of a content streaming client apparatus employing a P2P method according to an exemplary embodiment of the present invention. Hereinafter, a device into which an application employing both a server-client method and the P2P method is installed, according to the present invention, will be referred to as a "node".

Referring to FIG. 2, a client/P2P node 200 according to an exemplary embodiment of the present invention is a device that performs streaming of content that a user selects from a list of content, via a network interface 210, and reproduces the streaming result on a display 290. The client/P2P node 200 includes an application unit 260 that can provide both a server-client protocol and a P2P protocol, a storage unit 250, an adaptation manager 240, and middleware 220 and 230 that support the application unit 260.

The application unit 260 includes a P2P application 262 that operates when content streaming is performed with a specific peer according to the P2P method, and a streaming client 264 that operates when content streaming is performed with a specific server according to the server-client method. Also, the client/P2P node 200 includes both the middleware 220 (the "P2P middleware 220") supporting the P2P method, and the middleware 230 (the "SC middleware 230") supporting the server-client method. Both the middleware 220 and 230 provide a connection service according to a related protocol. The application unit 260 controls content to be received from a source device (a node or a server that transmits the content) by using middleware and a transfer layer corresponding to a determined streaming method (a protocol to be used), and the received content to be reproduced in the display 290. That is, the P2P middleware 220 is used by the P2P application 262, and the SC middleware 230 is used by the streaming client 264.

The adaptation manager 240 determines whether the client/P2P node 200 will act as a peer according to the P2P method or as a client according to the server-client method, in response to a user's request for content. Thus, the adaptation manager 240 creates a list of content and provides it to the user, determines one of at least one node and at least one server that share the selected content, as a source device which provides content, and determines a streaming method as a content sharing method that the source device employs.

The storage unit 250 stores the received content. When receiving a request for content from an external device, such as another node, the P2P application 262 controls the content that is to be read from the storage unit 250 and transmitted by using the P2P middleware 220.

Figure 3:
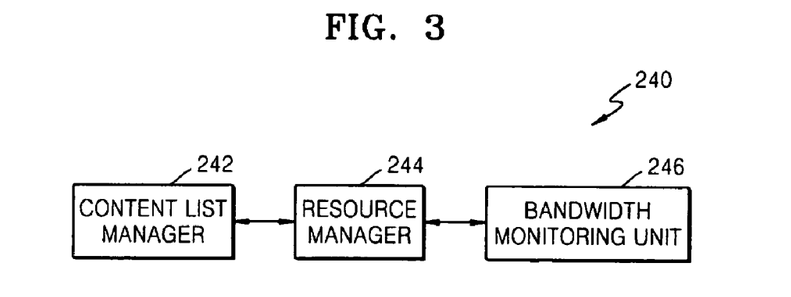
FIG. 3 is a detailed block diagram of an adaptation manager illustrated in FIG. 2 according to an exemplary embodiment of the present invention.

FIG. 3 is a detailed block diagram of the adaptation manager 240 illustrated in FIG. 2 according to an exemplary embodiment of the present invention. Referring to FIG. 3, the adaptation manager 240 includes a content list manager 242, a resource manager 244, and a bandwidth monitoring unit 246.

The content list manager 242 combines a plurality of lists of content received according to the P2P middleware 220 or the SC middleware 230 in order to create a list of content to be provided to a user, and displays the created list of content. The content list manager 242 is a module that conducts internal communications with the P2P middleware 220 and the SC middleware 230 in order to make a list of content that can be reproduced. That is, the content list manager 242 compares and combines the lists of the content from the P2P middleware 220 and the SC middleware 230.

The resource manager 244 determines a source device and a streaming method by using information regarding the list of content from the content list manager 242, and informs the application unit 260 of middleware corresponding to the determined streaming method. In order to set the most efficient streaming route, the resource manager 244 may further use information regarding available bandwidth between the client/P2P node 200 to which the resource manager 244 belongs, and each of a plurality of devices sharing the content. Thus, the resource manager 244 measures available bandwidth between the client/P2P node 200 and each of at least another node and the server sharing content, and determines a device having a maximum measured bandwidth as the source device. For bandwidth measurement, the bandwidth monitoring unit 245 may be used as an additional module that transmits a probe to devices under test, obtains their bandwidths based on the result of transmitting, and sends the obtained bandwidths to the resource manager 244. However, the present invention is not limited to the above method of measuring a bandwidth between devices, and various other methods can be used.

If the selected content is shared according to both the P2P method and the server-client method, i.e., when the content is shared by a plurality of devices using different sharing methods, the resource manager 244 must determine a protocol according to which the content will be received. In this case, the resource manager 244 may determine whether the selected content is requested according to a unicast method or a multicast method, and use the determination result in determining the protocol.

If the selected content is requested according to the multicast method, one of the at least one node sharing the content may be determined as the source device, since it is efficient to use a P2P protocol in the case of the multicast method. If a plurality of nodes share the content, a node having a maximum available bandwidth may be determined as the source device. If the selected content is requested according to the unicast method, content streaming may be started after determining one of the at least one node and the at least one server sharing the content, which has a maximum measured bandwidth, as the source device. In this case, information regarding load on each of the devices sharing the content may also be referred for the determining of the source device.

Figure 4:
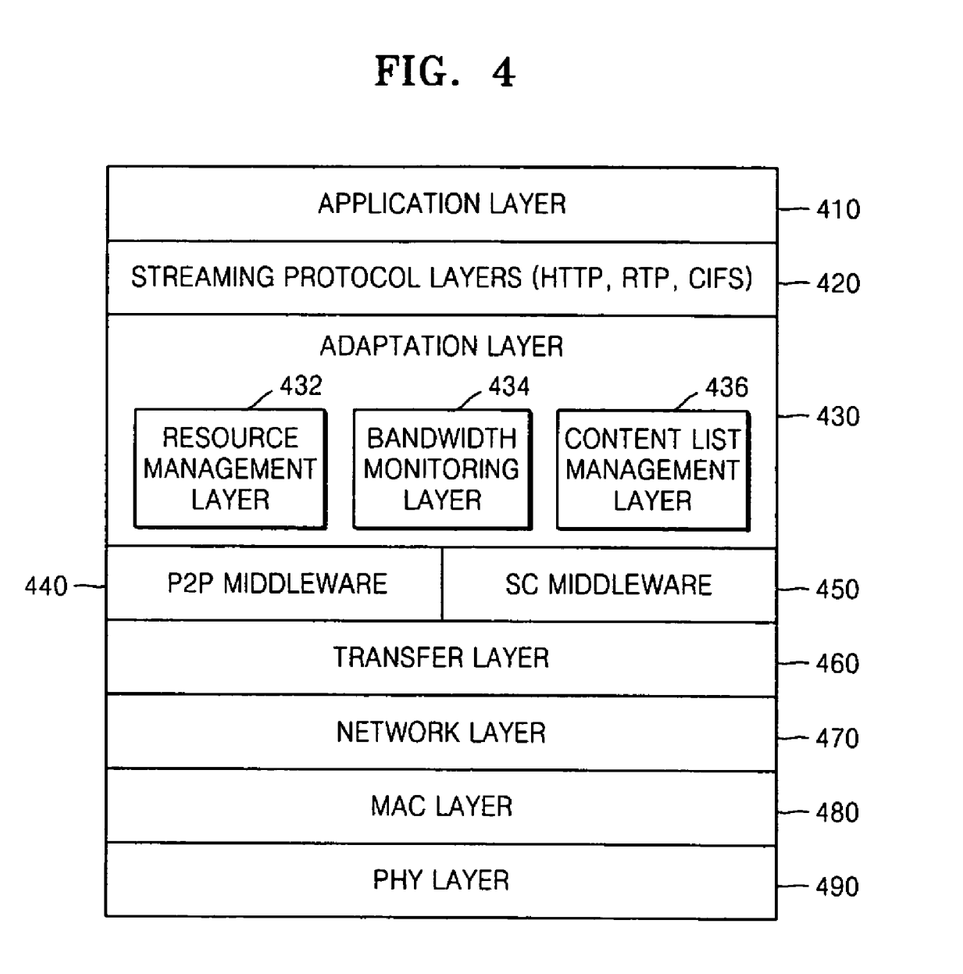
FIG. 4 is a block diagram of a protocol stack employing both the P2P method and the server-client method according to an exemplary embodiment of the present invention.

FIG. 4 is a block diagram of a protocol stack employing both the P2P method and the server-client method according to an exemplary embodiment of the present invention. Referring to FIG. 4, a node according to the present invention includes a physical (PHY) layer 490, a media access control (MAC) layer 480, a network layer 470, a transfer layer 460, and P2P middleware 440 and SC middleware 450 on the transfer layer 460. Also, the node includes an adaptation layer 430, comprised of three sub layers: a resource management layer 432, a bandwidth monitoring layer 434, and a content list management layer 436, which acts as an interface between an upper layer and the P2P middleware 440 or the SC middleware 450, if necessary. On the adaptation layer 430, a streaming protocol layer 420, such as a Hypertext Transfer Protocol (HTTP), a Real-time Transfer Protocol (RTP), or a Common Internet File System (CIFS), and an application layer 410 are formed.

Figure 5:
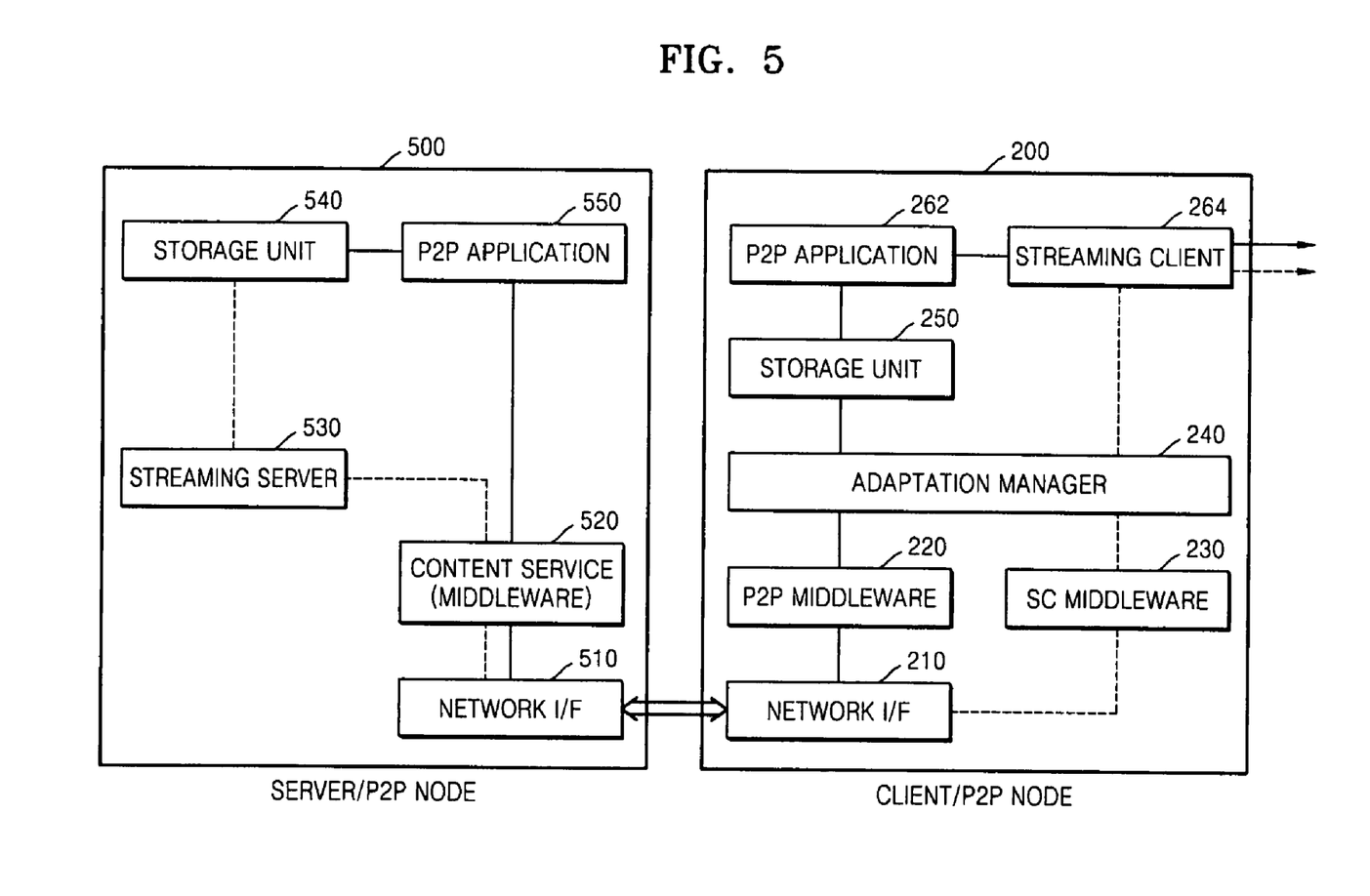
FIG. 5 is a block diagram for explaining access routes between a content streaming client apparatus and a server/P2P node according to an exemplary embodiment of the present invention.

FIG. 5 is a block diagram for explaining access routes between a content streaming client apparatus and a server/P2P node according to an exemplary embodiment of the present invention. Referring to FIG. 5, the server/P2P node 500 that can act as both a content providing server according to the server-client method and a peer according to the P2P method, is capable of accessing the client/P2P node 200 that can operate as both a content receiving client according to the server-client method and a peer according to the P2P method, via a network interface 510 using a server-client protocol or a P2P protocol. Also, the client/P2P node 200 is capable of accessing the server/P2P node 500 via the network interface 210 using the server-client protocol or the P2P protocol.

When an adaptation manager 240 of the client/P2P node 200 determines that content which is selected by a user is to be received according to the server-client method, a streaming service is performed via a route marked by dotted lines. First, a streaming client 264 requests the server/P2P node 500 to provide the content by using SC middleware 230. Then, a streaming server 530 of the server/P2P node 500 reads the requested content from a storage unit 540, and transmits it to the client/P2P node 200 by using middleware 520 for a content service. The client/P2P node 200 receives the content by using the SC middleware 230 and reproduces it using the streaming client 264.

When the adaptation manager 240 of the client/P2P node 200 determines content, which is selected by the user, to be received according to the P2P method, a streaming service is performed via a route marked by solid lines. First, a P2P application 262 requests the server/P2P node 500 to provide the content by using P2P middleware 220. Then, a P2P application 550 of the server/P2P node 500 reads the requested content from the storage unit 540 and transmits it to the client/P2P node 200 by using the middleware 520 for a content service. Then, the client/P2P node 200 receives the content by using the P2P middleware 220 and reproduces it using the P2P application 262.

Figure 6:
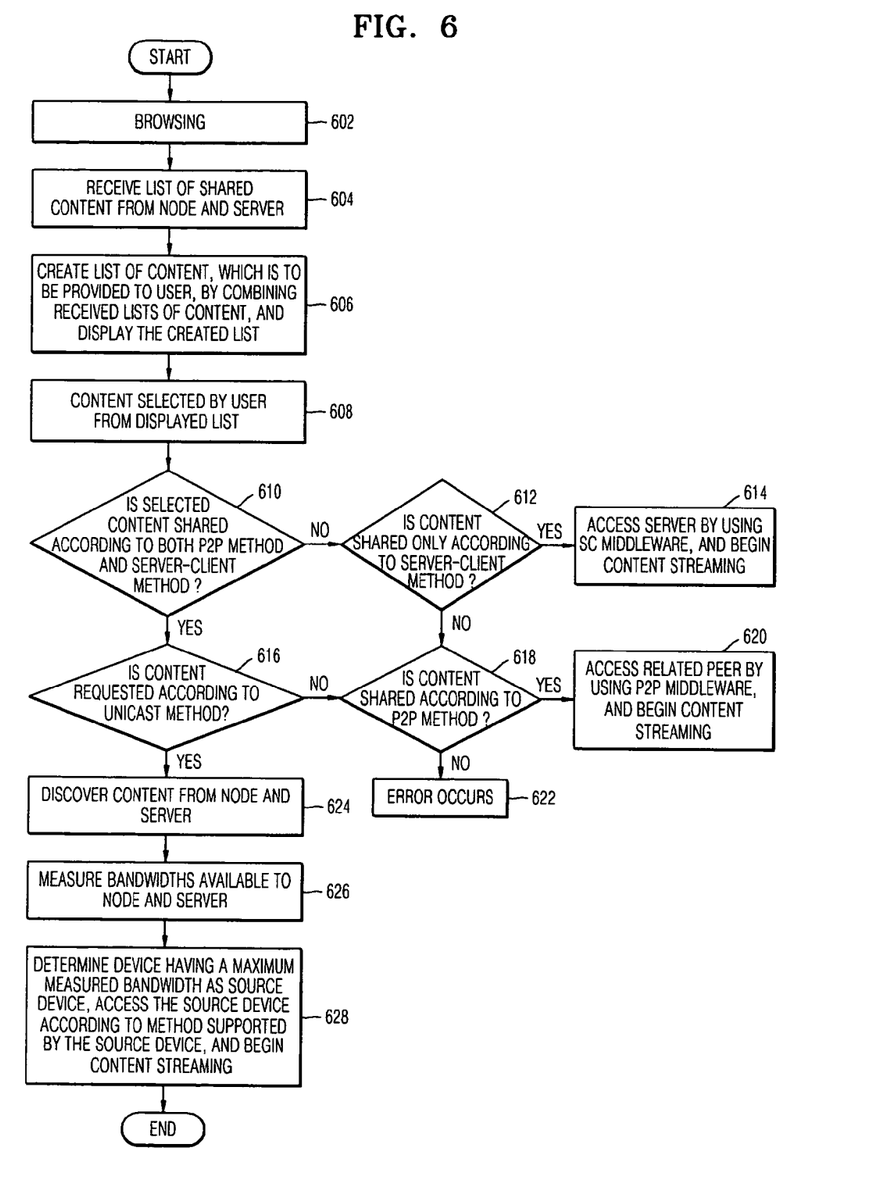
FIG. 6 is a flowchart illustrating a content streaming method according to an exemplary embodiment of the present invention.

FIG. 6 is a flowchart illustrating a content streaming method according to an exemplary embodiment of the present invention. Referring to FIG. 6, an application according to an exemplary embodiment of the present invention performs browsing by using P2P middleware and SC middleware (operation 602), and receives a list of shared content from detected nodes and servers (operation 604). Whenever browsing is performed, an adaptation manager analyzes and combines lists of content shared according to the P2P method and lists of content shared according to the server-client method in order to create a list of content to be provided to a user. Then, the created content list is displayed to the user (operation 606). Information regarding a method of sharing each content listed in the created content list, which need not be displayed to the user, is stored in order to be used to determine a source device and a streaming method.

Next, the user selects content, which is to be reproduced, from the displayed list (operation 608). A method of determining one of at least one node and at least one server sharing the selected content as a source device that transmits the content, will now be described. The adaptation manager may measure available bandwidth between a streaming client apparatus to which the adaptation manager belongs, and each of at least one node and at least one server sharing content, and determine a device having a maximum measured bandwidth as a source device. Also, a method of sharing content or a method of requesting content may be considered in determining a source device.

More specifically, first, the adaptation manager determines whether the selected content is shared according to both the P2P method and the server-client method (operation 610). If the selected content is shared according to one of the P2P method and the server-client method, the adaptation manager operates differently depending on whether the content is shared according to the P2P method or the server-client method. If it is determined that the selected content is shared only according to the server-client method (operation 612), the adaptation manager starts an SC protocol and the application operates according to the SC protocol. Then, the application accesses a shared server by using SC middleware, and begins streaming and reproduction of the content (operation 614). If it is determined that the selected content is shared only according to the P2P method (operation 618), the adaptation manager starts a P2P protocol, and the application operates according to the P2P protocol. The application accesses a related peer by using the P2P middleware, and begins streaming and reproduction of the content (operation 620). If the content is shared according to one of the P2P method and the server-client method but there are a plurality of servers (or nodes), one of the servers (or the nodes) may be determined as a source device based on available bandwidth.

If the content is shared according to both the P2P method and the server-client method, the adaptation manager determines whether the content is requested according to the unicast method or the multicast method. If it is determined that the content is requested according to the multicast method (operation 616), one of the at least one node sharing the content is determined as a source device. That is, the content is received according to the P2P method (operation 620). In this case, if it is determined that the content is not shared according to the P2P method (operation 618), an error occurs (operation 622). If it is determined in operation 616 that the content is requested according to the unicast method, the adaptation manager discovers the content from both the at least one node and the at least one server (operation 624). Then, the adaptation manager measures bandwidths available to the at least one node and the at least one server sharing the content (operation 626). Next, the adaptation manager determines a device having a maximum measured bandwidth as a source device, accesses the node (or the server) determined as the source device according to a method (the P2P method or the server-client method) supported by the source device, and begins content streaming (operation 628). For bandwidth measurement, a probe may be transmitted to the at least one node and the at least one server. However, the present invention is not limited to the above method of measuring bandwidths available to the at least one node and the at least one server. That is, since various methods are available, the adaptation manager may use one of them. Also, information regarding load on the shared server and the at least one node may be used in determining the source device.

Figure 7:
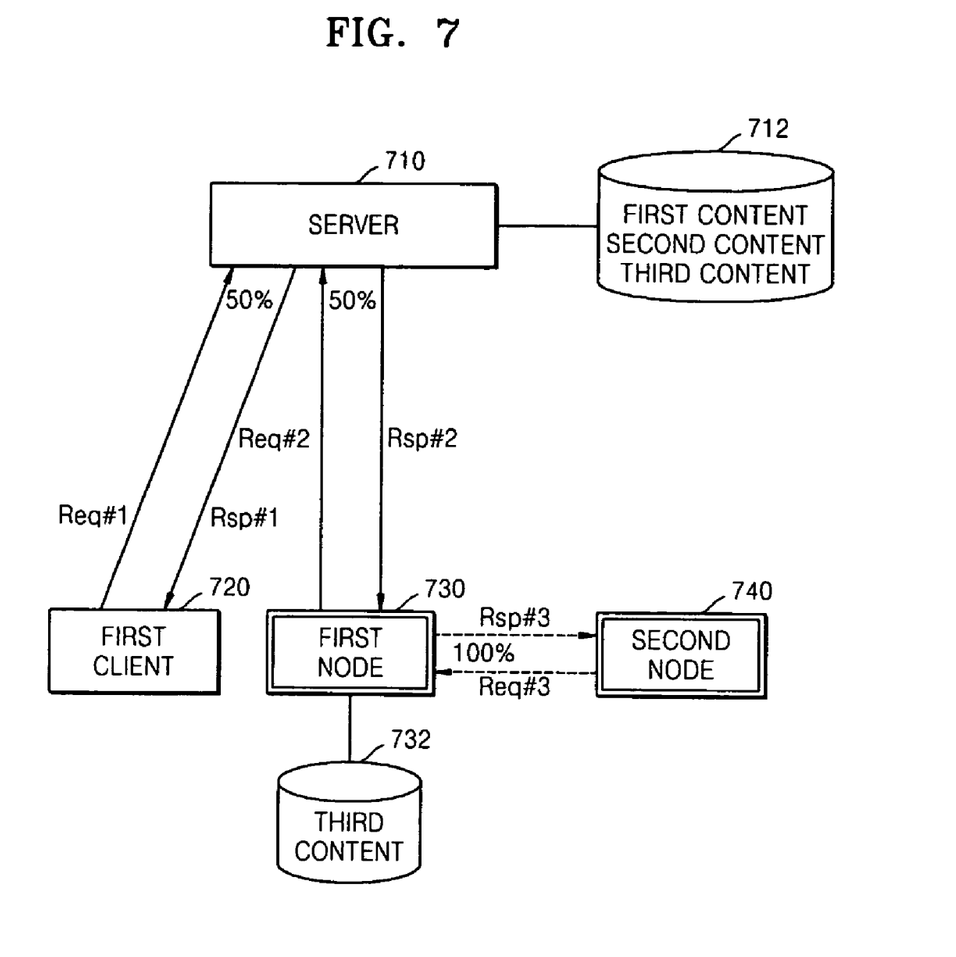
FIG. 7 is a block diagram for explaining a content streaming service according to an exemplary embodiment of the present invention.

FIG. 7 is a block diagram for explaining a content streaming service according to an exemplary embodiment of the present invention. Referring to FIG. 7, a server 710 and a first client 720 transmit or receive first content, and the server 710 transmits, according to the server-client method, second content to a first node 730 that is a client apparatus employing the P2P method, according to an exemplary embodiment of the present invention. In this case, 50% of bandwidth available to the server 710 is used by each of the first client 720 and first node 730. When a new second node 740 attempts to request third content, the second node 740 can recognize that the third content is shared according to both the P2P method and the server-client method since the first node 730 holds the third content in a storage unit 732 thereof. The second node 740 measures bandwidths available to the server 710 and the first node 730. If the bandwidth available to the server 710 is greater than the bandwidth available to the first node 730, the second node 740 accesses the server 710 to receive a streaming service. If the bandwidth available to the server 710 is less than the bandwidth available to the first node 730, the second node 740 determines the first node 730 as a source device and receives the third content according to the P2P method. In this case, even if the second node 740 begins content streaming, the first client 720 and the first node 730 can receive a streaming service with the same quality of service (QoS) as before the content streaming of the second node 740.

The above methods according to exemplary embodiments of the present invention can be embodied as computer readable code in a computer readable medium.

As described above, according to the exemplary embodiments of the present invention, the P2P method is applied to a streaming service according to the server-client method, thereby preventing the QoS of each client from being degraded due to too much load on a specific server, and efficiently utilizing network bandwidth available to a household.

While this invention has been particularly shown and described with reference to exemplary embodiments thereof, it will be understood by those of ordinary skill in the art that various changes in form and details may be made therein without departing from the spirit and scope of the invention as defined by the appended claims.

What is claimed is:

1. A streaming client apparatus which performs streaming of content selected from a list of content via a network interface, and reproduces the streamed content, the apparatus comprising:
   peer-to-peer (P2P) middleware which supports a P2P method;
   server-client middleware which supports a server-client method;
   an adaptation manager which performs browsing to detect at least one node and at least one server sharing content with the streaming client apparatus by using the P2P middleware and the server-client middleware, receives lists of content from the detected at least one node and at least one server through the P2P middleware and the server-client middleware, creates a shared content list by combining the received lists of content, the shared content list comprising information regarding a method of sharing each content listed in the shared content list, provides the shared content list to a user, determines a source device for content selected from the shared content list by the user from among the at least one node and at least one server, by using the shared content list, and determines a method of sharing the selected content as a streaming method, by using the shared content list; and
   an application unit which controls the selected content to be received from the source device by using the P2P middleware when the determined streaming method is the P2P method and by using the server-client middleware when the determined streaming method is the server-client method, and which controls the received content to be reproduced.

2. The apparatus of claim 1, further comprising:
   a storage unit which stores the received content,
   wherein, if an external device requests content, the application unit controls the requested content to be read from the storage unit and the read content to be transmitted through the P2P middleware.

3. The apparatus of claim 1, wherein the adaptation manager comprises a resource manager which determines the source device and the streaming method, and informs the application unit of middleware corresponding to the determined streaming method.

4. The apparatus of claim 3, wherein the resource manager measures available bandwidth between the streaming client apparatus and each of the at least one node and the at least one server which share the selected content, and determines one of the at least one node and the at least one server, which has a maximum measured bandwidth, as the source device.

5. The apparatus of claim 4, wherein the adaptation manager further comprises a bandwidth monitoring unit which transmits a probe to the at least one node and the at least one server which share the selected content, obtains the bandwidths available to the at least one node and the at least one server based on a result of the transmitting the probe, and transmits the bandwidths to the resource manager.

6. The apparatus of claim 3, wherein, if the selected content is shared according to both the P2P method and the server-client method and requested according to a multicast method, the resource manager determines one of the at least one node which shares the selected content as the source device and the P2P method as the streaming method.

7. The apparatus of claim 3, wherein, if the selected content is shared according to both the P2P method and the server-client method and requested according to a unicast method, the resource manager measures available bandwidth between the streaming client apparatus and each of at least one node and at least one server which share the selected content, and determines one of the at least one node and the at least one server, which has a maximum measured bandwidth, as the source device.

8. A method of streaming content in a content streaming client apparatus, the method comprising:
    browsing to detect at least one node and at least one server sharing content with the content streaming client apparatus by using a peer-to-peer (P2P) method and a server-client method;
    receiving a list of content shared according to the P2P method and a list of content shared according to the server-client method, from the detected at least one node and at least one server;
    creating a shared content list by combining the received lists of content, the shared content list comprising information regarding a method of sharing each content listed in the shared content list;
    providing the shared content list to a user;
    determining a source device for content selected from the shared content list by the user from among the at least one node and the at least one server, by using the shared content list;
    determining a method of sharing the selected content to be one of the P2P method and the server-client method, by using the shared content list; and
    receiving the selected content from the determined source device according to the determined sharing method.

9. The method of claim 8, wherein the determining of the source device comprises:
    measuring available bandwidth between the streaming client apparatus and each of the at least one node and the at least one server sharing the selected content; and
    determining one of the at least one node and the at least one server, which has a maximum measured bandwidth, as the source device.

10. The method of claim 9, wherein the measuring of the available bandwidth comprises:
    transmitting a probe to each of the at least one node and the at least one server sharing the selected content; and
    acquiring the bandwidth based on a result of the transmitting the probe.

11. The method of claim 8, wherein, if the selected content is shared according to both the P2P method and the server-client method, the determining of the source device comprises:
    determining whether the selected content is requested according to a unicast method or a multicast method; and
    if the selected content is requested according to the multicast method, determining one of the at least one node sharing the selected content as the source device and the P2P method as the streaming method.

12. The method of claim 8, wherein, if the selected content is shared according to both the P2P method and the server-client method, the determining of the source device comprises:
    determining whether the selected content is requested according to a unicast method or a multicast method;
    if the selected content is requested according to the unicast method, measuring available bandwidth between the streaming client apparatus and each of the at least one node and the at least one server sharing the selected content; and
    determining one of the at least one node and the at least one server, which has a maximum measured bandwidth, as the source device.

13. The method of claim 12, wherein the measuring of the available bandwidth comprises:
    transmitting a probe to the at least one node and the at least one server sharing the selected content; and
    obtaining the available bandwidth based on a result of the transmitting the probe.

14. A non-transitory computer readable medium having recorded thereon a program for executing a content streaming method in a content streaming client apparatus, the method comprising:
    browsing to detect at least one node and at least one server sharing content with the content streaming client apparatus by using a peer-to-peer (P2P) method and a server-client method;
    receiving a list of content shared according to the P2P method and a list of content shared according to the server-client method, from the detected at least one node and at least one server;
    creating a shared content list by combining the received lists of content, the shared content list comprising information regarding a method of sharing each content listed in the shared content list;
    providing the shared content list to a user;
    determining a source device for content selected from the shared content list by the user from among the at least one node and the at least one server, by using the shared content list;
    determining the method of sharing the selected content to be one of the P2P method and the server-client method, by using the shared content list; and
    receiving the selected content from the determined source device according to the determined sharing method.

* * * * *